United States Patent
Hou

(10) Patent No.: US 6,922,284 B1
(45) Date of Patent: Jul. 26, 2005

(54) METHOD FOR AUTOMATICALLY CONTROLLING THE LENGTH OF PROJECTION SCREEN AND MULTI-PURPOSE APPARATUS THEREOF

(76) Inventor: Alpha Hou, 1013 Craig Dr., San Jose, CA (US) 95129

( * ) Notice: Subject to any disclaimer, the term of this patent is extended or adjusted under 35 U.S.C. 154(b) by 0 days.

(21) Appl. No.: 10/763,194

(22) Filed: Jan. 26, 2004

(51) Int. Cl.⁷ .............................................. G03B 21/56
(52) U.S. Cl. ...................................... 359/443; 359/461
(58) Field of Search ............................... 359/443, 450, 359/461, 446; 160/238, 242, 310

(56) References Cited

U.S. PATENT DOCUMENTS

| | | | | |
|---|---|---|---|---|
| 5,121,977 A | * | 6/1992 | Weisgerber | 359/450 |
| 5,548,356 A | * | 8/1996 | Portman | 359/443 |
| 5,737,123 A | * | 4/1998 | Donohoe | 359/450 |
| 6,462,868 B1 | * | 10/2002 | Giesberg et al. | 359/443 |
| 6,507,435 B1 | * | 1/2003 | Bergman | 359/443 |

* cited by examiner

*Primary Examiner*—Christopher Mahoney
(74) *Attorney, Agent, or Firm*—Rosenberg, Klein & Lee

(57) ABSTRACT

A method for automatically controlling the length of a projection screen and an apparatus thereof are proposed. They dispose a code stripe on at least a side of the projection screen and then exploit a detector of an auto-controlled hoister to read the code stripe. The detected signal is converted into digital data for comparison with the data stored in a storage device of the auto-controlled hoister so that the auto-controlled hoister can control the length of the projection screen exactly. Hence, a multi-purpose apparatus can be provided.

19 Claims, 9 Drawing Sheets

METHOD FOR AUTOMATICALLY CONTROLLING THE LENGTH OF PROJECTION SCREEN AND MULTI-PURPOSE APPARATUS THEREOF

FIELD OF THE INVENTION

The present invention is directed to a method for automatically controlling the length of a projection screen and a multi-purpose apparatus thereof, and more particularly, to a projection screen auto-control method that disposes a code stripe on at least a side of the projection screen and then exploits an auto-controlled hoister to read the code stripe and control the length of the projection screen so as to provide the multi-purpose apparatus.

BACKGROUND OF THE INVENTION

In a general conference or family meetings, a projector is usually used to project materials on a screen. Since the projector projects the materials on the screen via a light beam, the place of display is commonly a dark room so as to prevent interference from external light. The projection mechanism of the projectors is one of the methods currently often used by people to share their materials with others.

However, the length of the screen of the projector is commonly fixed or manually controlled. Since the distance of the projector from the screen affects the length of the screen, the length of the screen should be adjusted accordingly. Hence, a user usually needs to adjust the length of the screen manually, which is not convenient.

Therefore, how to control automatically the length of the projection screen directed to the problem discussed above to resolve the drawback of the conventional projection screen whose length needs to be adjusted manually and to allow the length of the projection screen to be controlled automatically or by a program has been desired by users and the inventor of the present invention for a long time. Hence, based on the practical experiences of research, development and sales of related products over the years, the inventor of the present invention tried his best to survey, design and research with his professional knowledge to solve the problem of the prior art. Eventually, the inventor figured out a method for automatically controlling the length of the projection screen that can resolve the problem described above and discloses the same below in detail.

SUMMARY OF THE INVENTION

An objective of the present invention is to provide a method for automatically controlling the length of a projection screen and a multi-purpose apparatus thereof. The method disposes a code stripe on at least a side of the projection screen and then exploits an auto-controlled hoister to read the code stripe and control the length of the projection screen according to the length set by a user so as to provide the multi-purpose apparatus.

Another objective of the present invention is to provide a method for automatically controlling the length of a projection screen and a multi-purpose apparatus thereof. The method can exactly control the length of the projection screen and provide a multi-purpose apparatus via employing the code stripe and using an auto-controlled hoister to read the code stripe.

For reaching the objective above, the present invention provides a method for automatically controlling the length of a projection screen and a multi-purpose apparatus thereof. It exactly controls the length of the projection screen and provides the multi-purpose apparatus via disposing at least a code stripe on at least a side of the projection screen and using an auto-controlled hoister to read the code stripe.

Numerous additional features, benefits and details of the present invention are described in the detailed description, which follows.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention is used to resolve the drawback of the conventional projection screen, whose length must be adjusted manually, which is not convenient. Via disposing the code stripe at a side of the screen disclosed in the present invention, the length of the projection screen can be adjusted automatically and need not be adjusted manually. Hence, the present invention provides a convenient method.

Figure 1:
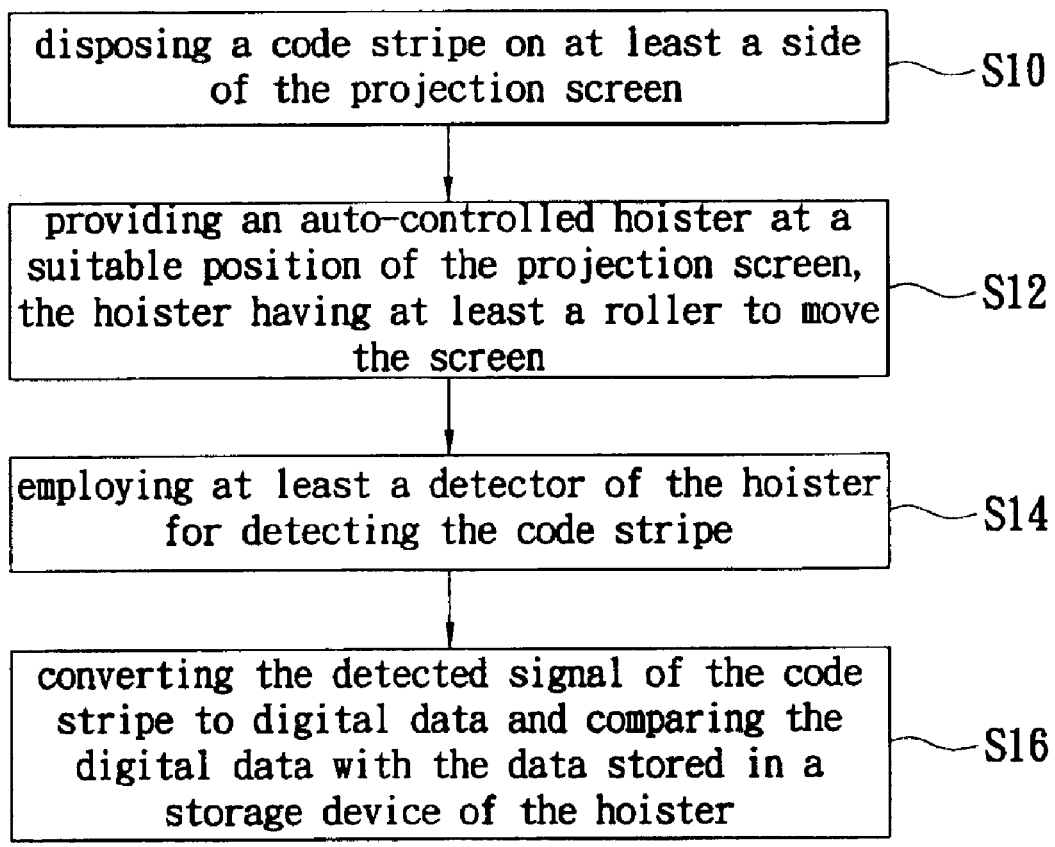
FIG. 1 is a flowchart of a preferred embodiment in compliance with the present invention.

First, reference is made to FIG. 1, which is a flowchart of a preferred embodiment in compliance with the present invention. As shown in the figure, the method for automatically controlling the length of a projection screen primarily includes following steps:

Step 10: disposing a code stripe on at least a side of the projection screen;

Step 12: providing an auto-controlled hoister at a suitable position of the projection screen, the hoister having at least a roller to move the screen;

Step 14: employing at least a detector of the hoister for detecting the code stripe; and Step 16: converting the detected signal of the code stripe into digital data and comparing the digital data with the data stored in a storage device of the hoister.

Thus, via disposing at least a code stripe on at least a side of the projection screen and using an auto-controlled hoister to control exactly the length of the projection screen, the length of the screen can be preset in the hoister directly or adjusted by a radio remote control device via controlling the operation of the hoister.

Figure 2A:
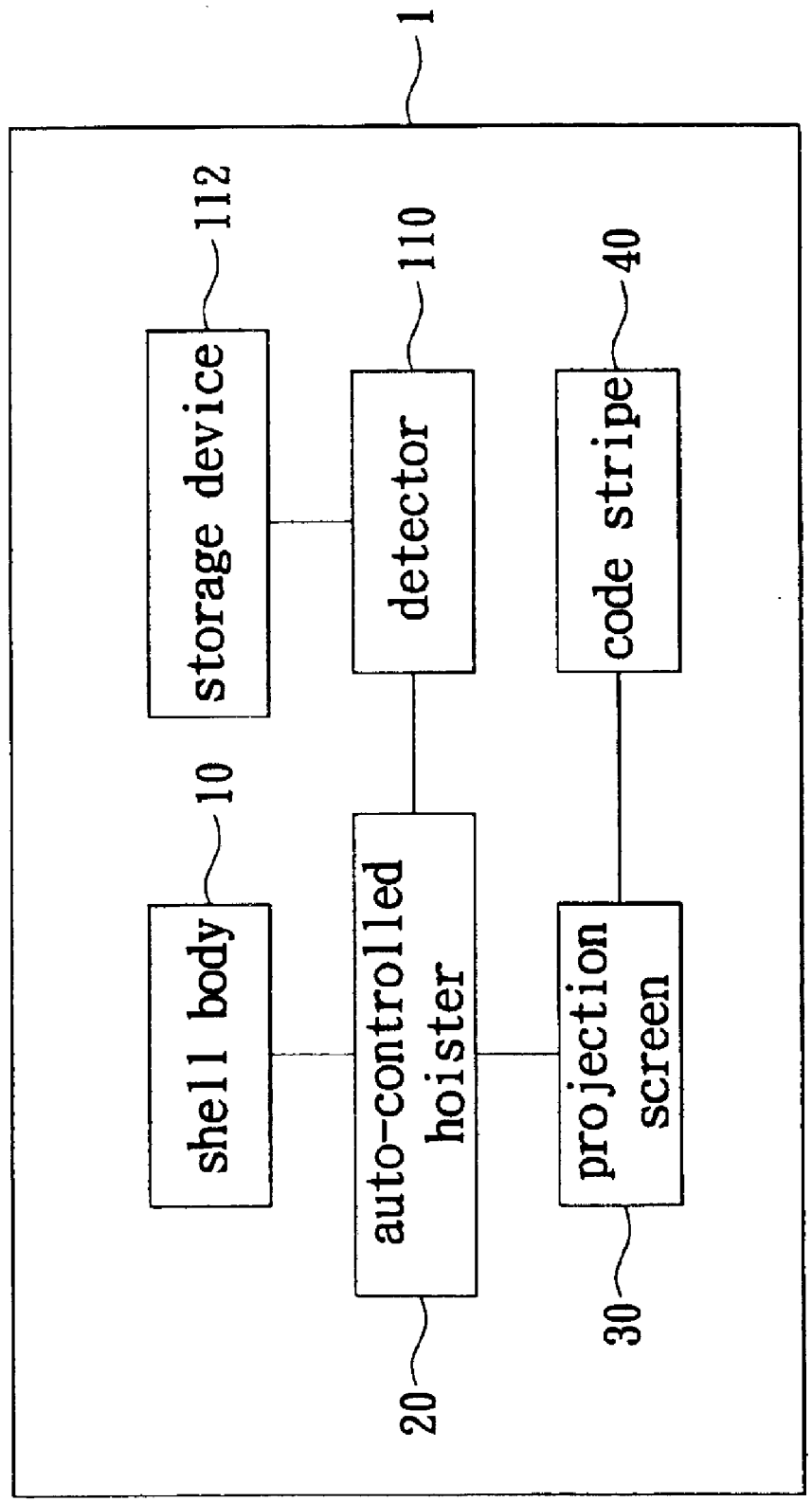
FIGS. 2a and 2b are block and schematic diagrams, respectively, of a preferred embodiment in compliance with the present invention.
Figure 2B:
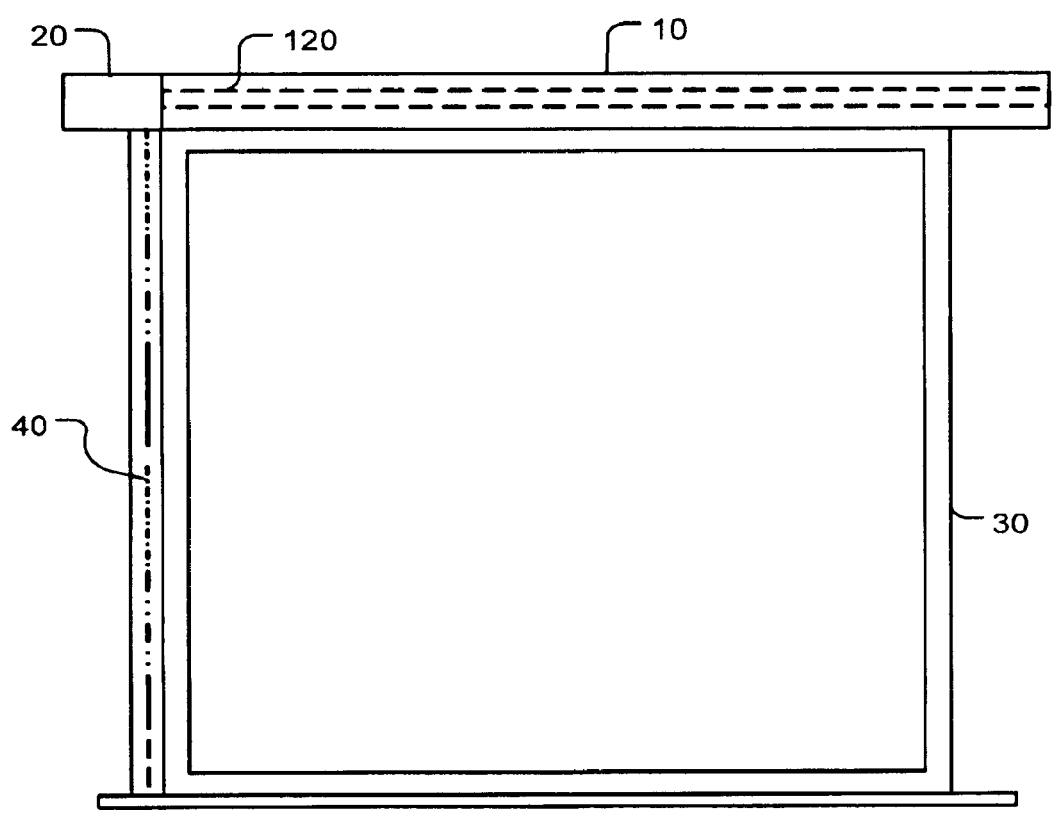

Reference is made to FIGS. 2a and 2b, which are respectively a block diagram and a schematic of a preferred embodiment in compliance with the present invention. As shown in the figures, the method for automatically controlling the length of a projection screen is applied to a screen-controlling apparatus 1, which includes a shell body 10, an auto-controlled hoister 20 and a projection screen 30.

The projection screen 30 is moved for storage into the shell body 10 by a first roller 120 and has at least a side with a code stripe 40. The auto-controlled hoister 20 has a detector 110 to detect the code stripe 40 of the projection screen 30 and has a storage device 112. The length of the projection screen 30 can be exactly controlled via comparing the detected data of the code stripe 40 and the data stored in the storage device 112.

Figure 3A:
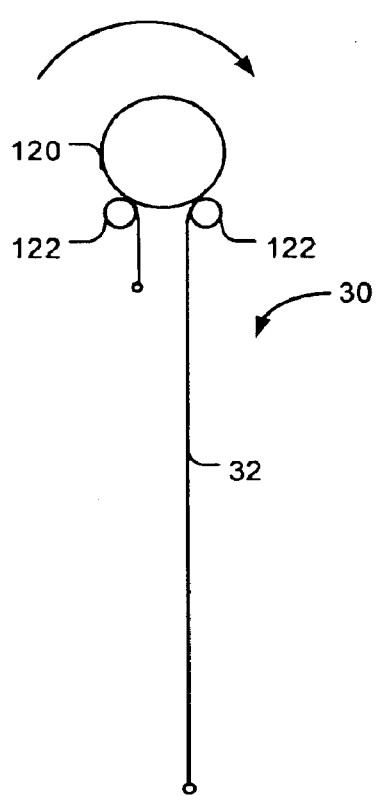
FIGS. 3a and 3b are diagrams of a preferred embodiment for automatically detecting the length of the screen in compliance with the present invention.
Figure 3B:
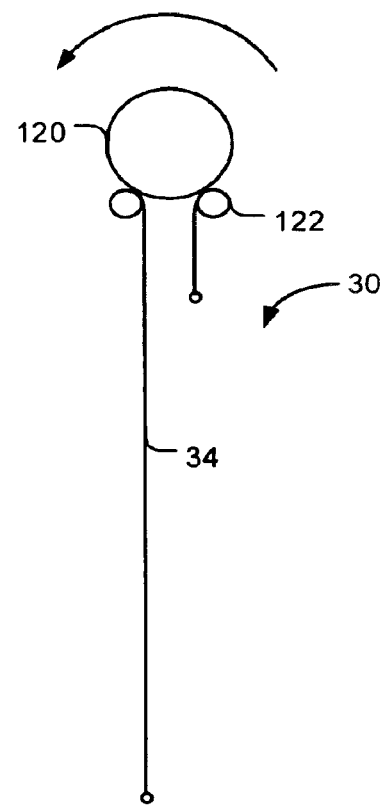

Reference is made to FIGS. 3a and 3b, which are diagrams of a preferred embodiment for automatically detecting the length of the projection screen in compliance with the present invention. As shown in the figure, this embodiment employs the first roller 120 to move the projection screen 30 forward or backward. The backside of the projection screen 30 has a figure, which can be, for example, scenery, a picture for beautifying the environment or a picture for expressing an ideology. This apparatus can be used in different situations with multiple functions. Hence, one side of the projection screen 30 is a screen 32 and the other side is a FIG. 34. Further, the projection screen 30 can be controlled with a slow speed via using a skid-proof wheel 122.

Figure 4:
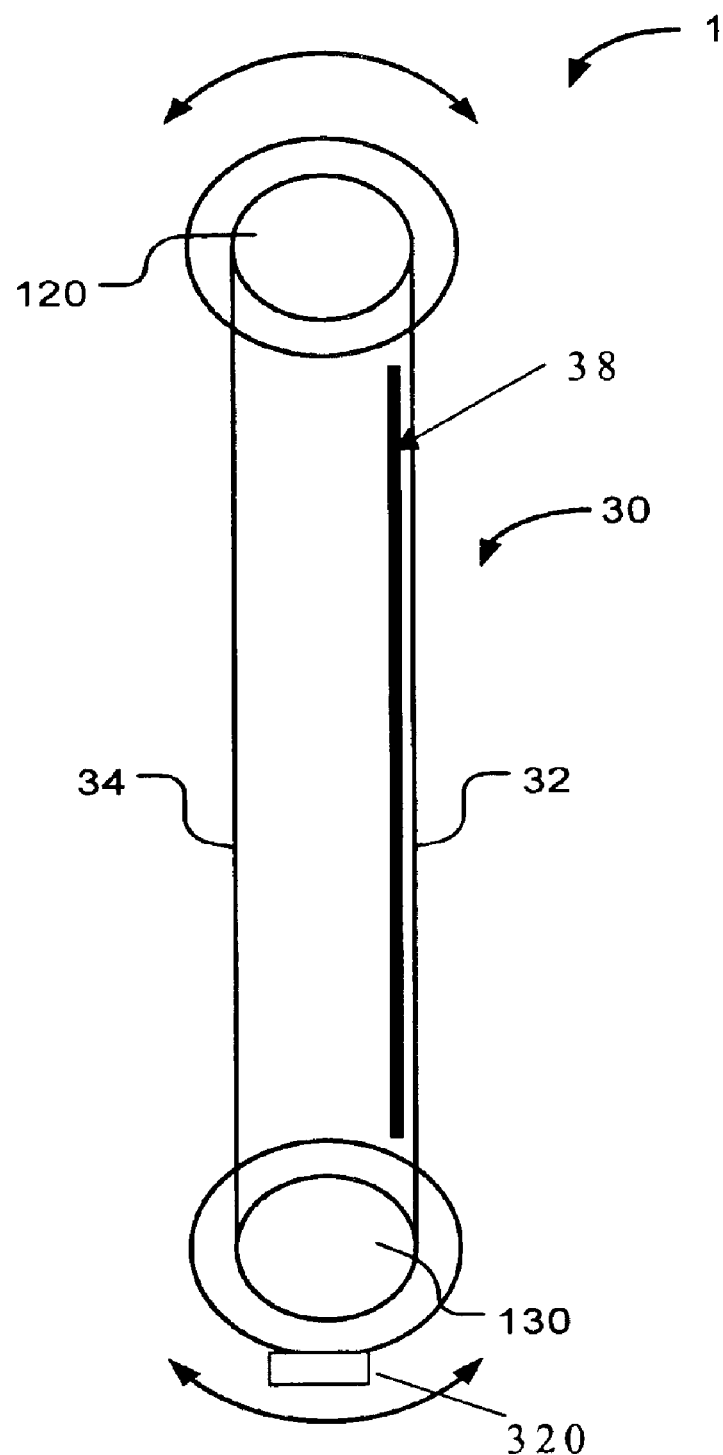
FIG. 4 is a schematic diagram of another preferred embodiment for automatically detecting the length of the screen in compliance with the present invention.

Reference is made to FIG. 4, which is a schematic diagram of another preferred embodiment for automatically detecting the length of the screen in compliance with the present invention. As shown in the figure, the detector of this embodiment is the same as that disclosed above. The main difference is that the screen-controlling apparatus 1 of this embodiment further includes a second roller 130, which is disposed opposite the first roller 120. The projection screen 30 surrounds the outsides of the first roller 120 and second roller 130 so that the projection screen 30 can be moved in a circular fashion. The projection screen 30 has a screen 32 and a figure or a white surface 34 having a hard board 38 disposed behind as a whiteboard. However, in this embodiment, the screen 32 and figure or white surface 34 are disposed at the same side, not different sides, to provide multiple functions.

Figure 5:
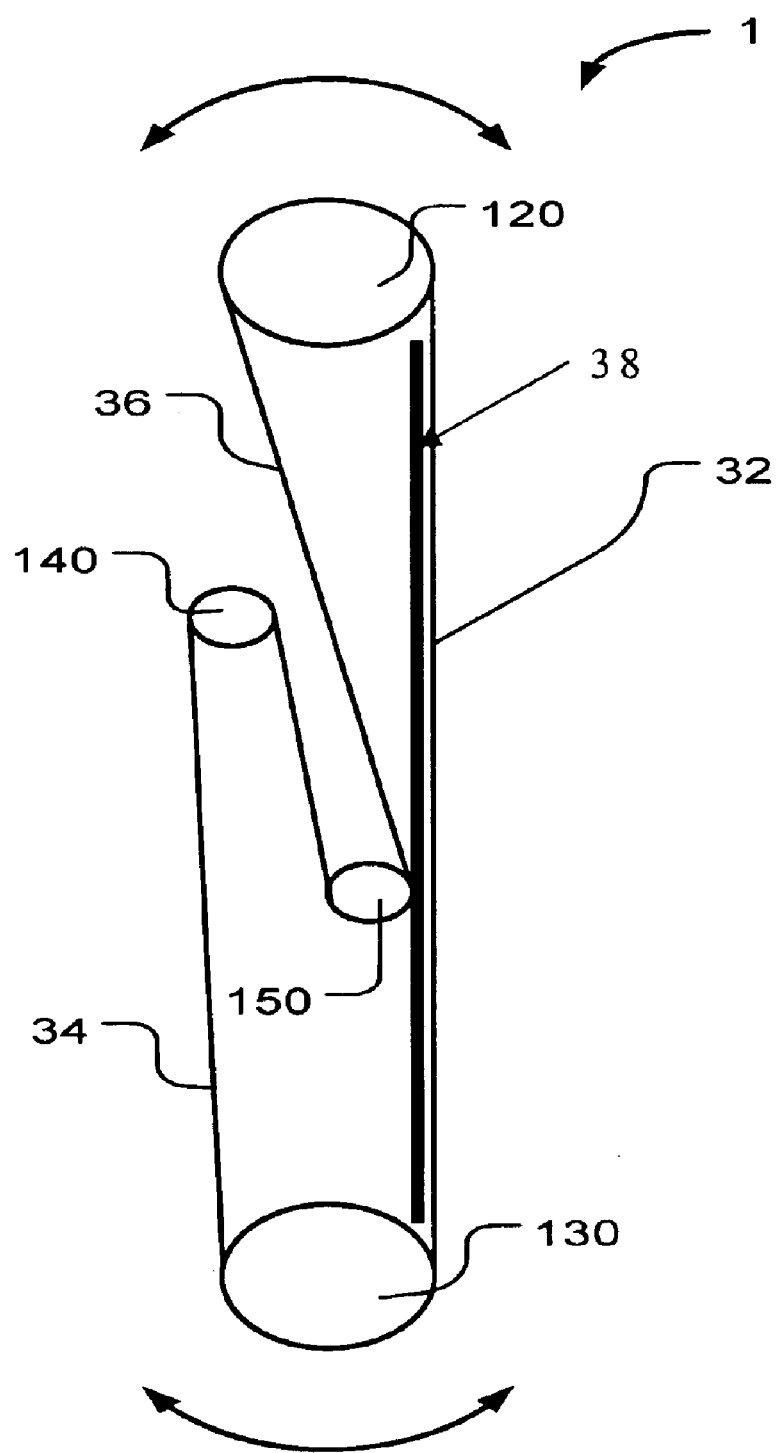
FIG. 5 is a schematic diagram of another preferred embodiment for automatically detecting the length of the screen in compliance with the present invention.

Reference is made FIG. 5, which is a schematic diagram of another preferred embodiment for automatically detecting the length of the screen in compliance with the present invention. As shown in the figure, the code stripe is the same as that disclosed above. The main difference is that the screen-controlling apparatus 1 of this embodiment further includes a third roller 140 and a fourth roller 150, which are disposed between the first roller 120 and the second roller 130. The projection screen 30 surrounds the outsides of the first roller 120, second roller 130, third roller 140 and fourth roller 150 so that the projection screen 30 can be moved in a circular manner. Similarly, the projection screen 30 has a screen 32 and a FIG. 34 and a whiteboard 36. In this embodiment, the screen 32, FIG. 34 and whiteboard 36 are disposed on the same, not different, sides to provide multiple functions.

Figure 6:
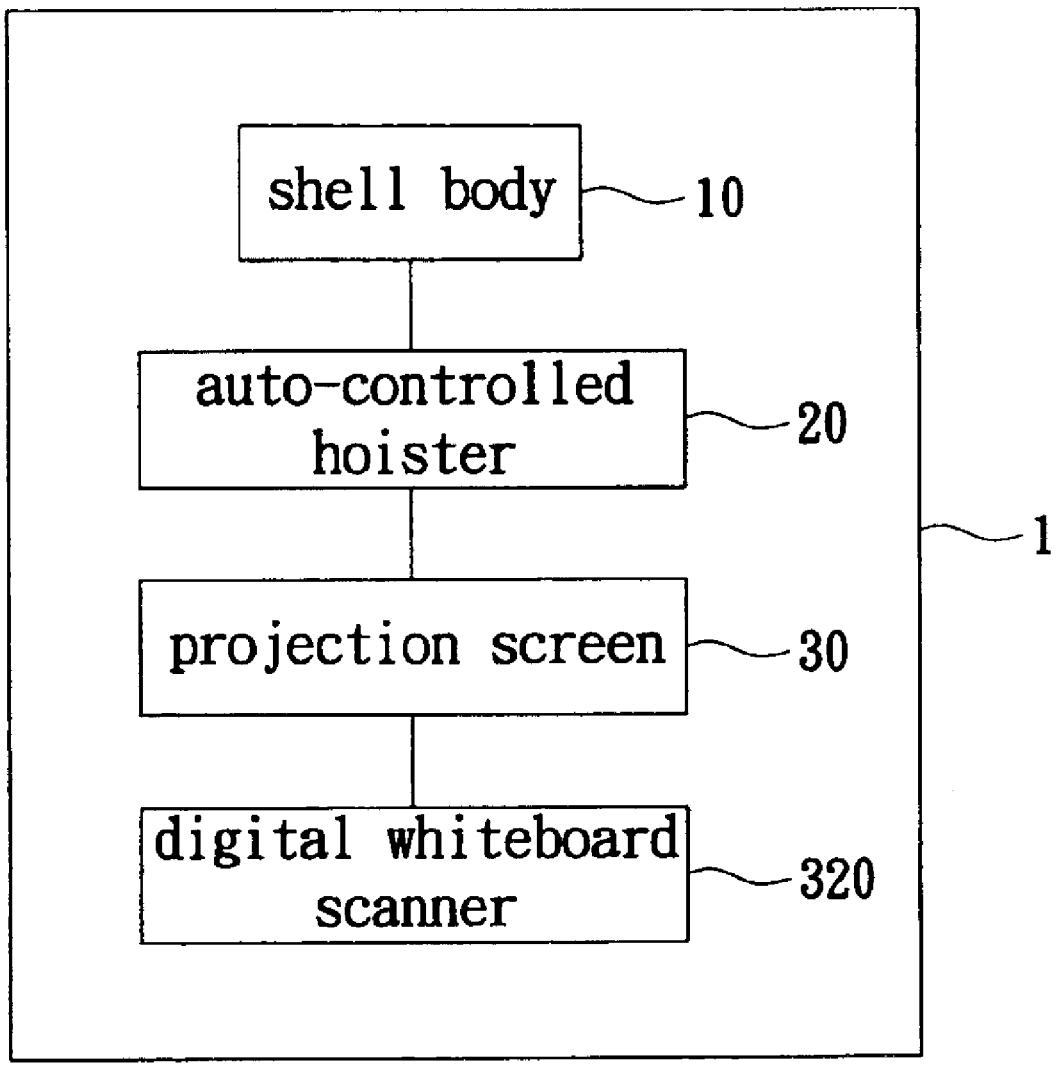
FIG. 6 is a block diagram of another preferred embodiment for automatically detecting the length of the screen in compliance with the present invention.

Reference is made to FIG. 6, which is a block diagram of another preferred embodiment for automatically detecting the length of the screen in compliance with the present invention. As shown in the figure, in the embodiments illustrated in FIGS. 5 and 6, the projection screen 30 has multiple functions: it can be a screen, a figure or a whiteboard. The whiteboard further includes a digital whiteboard scanner 320 to download the materials written on the whiteboard or print them.

Figure 7A:
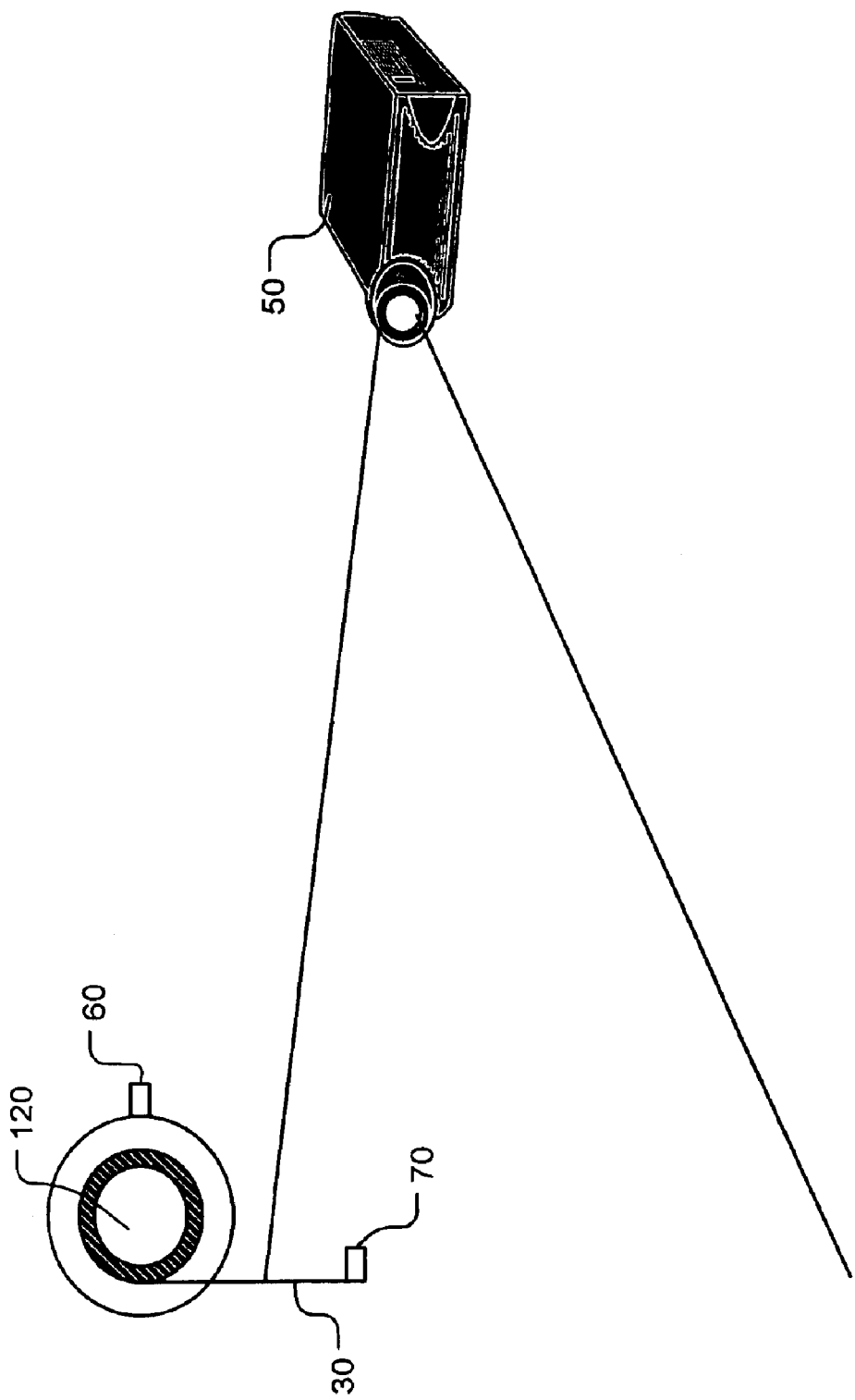
FIGS. 7a and 7b are diagrams of a preferred embodiment of an apparatus used for automatically detecting the length of the screen in compliance with the present invention.
Figure 7B:
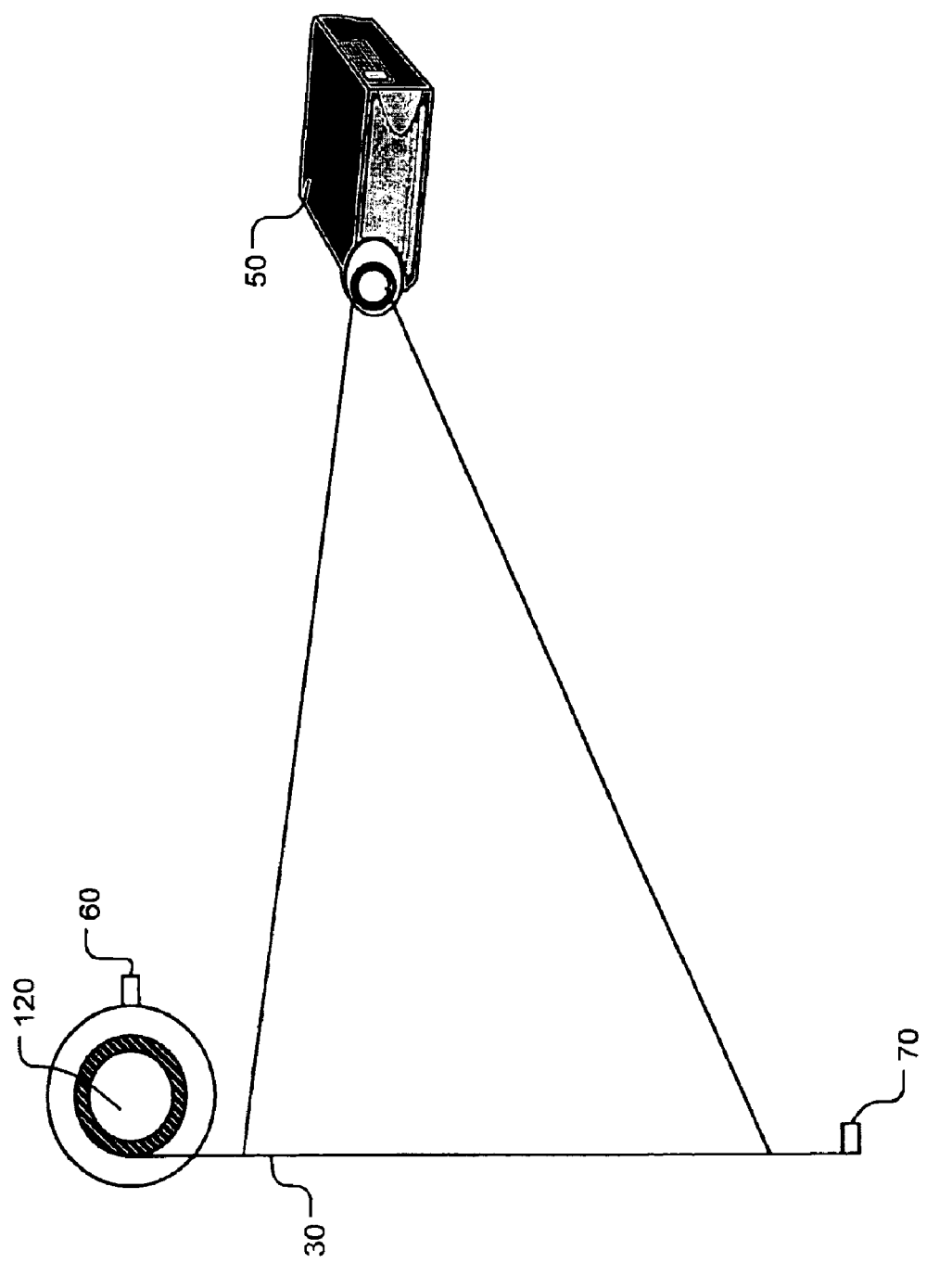

Reference is made to FIGS. 7a and 7b, which are diagrams of a preferred embodiment of an apparatus used for automatically detecting the length of the screen in compliance with the present invention. As shown in the figures, the first optical detector 60 is used to detect the value of the environmental light and the second optical detector 70 is directly exposed to the light output by the projector 50. Because the detected value of the second optical detector 70 is larger than that of the first optical detector 60, the hoister 20 will move the projection screen 30 downward constantly. When the detected value of the second optical detector 70 is equal to that of the first optical detector 60, the hoister 20 will stop moving the projection screen 30 downward. Via this mechanism, the length of the projection screen 30 can be controlled automatically and need not be controlled manually. Moreover, the first optical detector 60 and second optical detector 70 are connected to a microprocessor via wireless or wired transmission for comparing the detected values so as to control the hoister 20. These techniques of connection and control are well known and not the features of the present invention. Hence, they will not be illustrated further. The main point of the present invention is the use of the optical detectors to control automatically the projection screen.

The present invention provides a method for automatically controlling the length of a projection screen and a multi-purpose apparatus thereof. A code stripe is provided on at least a side of the projection screen and dispose a detector on an auto-controlled hoister to scan the code stripe or read the code stripe via magnetism or other methods. Then, the detected signal is converted into digital data for comparison with the digital data stored in the storage device of the auto-controlled hoister so that the hoister can automatically adjust the length of the screen exactly.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A method for automatically controlling a length of a projection screen, comprising:

disposing a code stripe on at least a side of the projection screen;

providing an auto-controlled hoister at a suitable position of the projection screen, the hoister having at least a roller to move the projection screen;

employing at least a detector or a magnetic reading device of the hoister to detect or read the code stripe; and converting a detected or read signal of the code stripe into digital data and comparing the digital data with data stored in a storage device of the auto-controlled hoister;

wherein the auto-controlled hoister is capable of automatically adjusting the length of the projection screen exactly via disposing the code stripe on the side of the projection screen.

2. The method as claimed in claim 1, wherein the data stored in the storage device correspond to the length of the projection screen.

3. The method as claimed in claim 1, wherein the length of the projection screen is preset in the auto-controlled hoister.

4. The method as claimed in claim 1, wherein the length of the projection screen is directly adjusted by a wireless remote controller via controlling the auto-controlled hoister.

5. A apparatus for automatically controlling a length of a projection screen, wherein a projector is placed at a suitable distance from the apparatus, the apparatus comprising:

a screen-controlling apparatus having an auto-controlled hoister, a detector and a storage device; and a projection screen having a code stripe disposed on at least a side thereof.

6. The apparatus as claimed in claim 5, wherein the screen-controlling apparatus further has a shell body to store the projection screen.

7. The apparatus as claimed in claim 5, wherein the auto-controlled hoister has a first roller and the projection screen is wound on an outside of the first roller for storage.

8. The apparatus as claimed in claim 5, wherein a backside of the projection screen is a figure.

9. The apparatus as claimed in claim 8, wherein the figure is scenery.

10. The apparatus as claimed in claim 8, wherein the figure is a picture for beautifying an environment or expressing an ideology.

11. The apparatus as claimed in claim 5, wherein a backside of the projection screen is a surface of a whiteboard.

12. The apparatus as claimed in claim 11, wherein the whiteboard has a digital whiteboard scanner.

13. The apparatus as claimed in claim 5, wherein the screen-controlling apparatus further includes a second roller, the second roller is disposed at a position opposite a first roller, and the projection screen is a ring and surrounds outsides of the first roller and the second roller so as to be moved circularly.

14. The apparatus as claimed in claim 13, wherein the screen-controlling apparatus further includes a surface of a whiteboard or a figure disposed on a same side.

15. The apparatus as claimed in claim 14, wherein the whiteboard has a digital whiteboard scanner.

16. The apparatus as claimed in claim 13, wherein the screen-controlling apparatus further includes a third roller and a fourth roller, the third roller and the fourth roller are disposed between the first roller and the second roller, and the projection screen is a ring and surrounds outsides of the first roller and the second roller and outsides of the third roller and the fourth roller so as to be moved circularly.

17. The apparatus as claimed in claim 16, wherein the screen-controlling apparatus further includes a surface of a whiteboard or a figure disposed on a same side.

18. The apparatus as claimed in claim 17, wherein the whiteboard has a digital whiteboard scanner.

19. The apparatus as claimed in claim 5, wherein the screen-controlling apparatus further includes a first optical detector and one end of the projection screen has a second optical detector; wherein:

when a light is projected on the projection screen from the projector and the projection screen is moved downward, the first optical detector is used to detect a first lightness value for reference and the second optical detector is used to detect a second lightness value; and when the second lightness value is equal to the first lightness value, the auto-controlled hoister stops, moving the projection screen so that the length of the projection screen is automatically controlled.

* * * * *